(12) United States Patent
Zhu et al.

(10) Patent No.: US 12,301,390 B2
(45) Date of Patent: May 13, 2025

(54) ANALOG PRE-DISTORTION PROCESSING CIRCUIT AND SIGNAL PROCESSING DEVICE

(71) Applicant: COMBA NETWORK SYSTEMS COMPANY LIMITED, Guangzhou (CN)

(72) Inventors: Jinxiong Zhu, Guangzhou (CN); Qiyan Fan, Guangzhou (CN); Luping Xie, Guangzhou (CN)

(73) Assignee: COMBA NETWORK SYSTEMS COMPANY LIMITED, Guangzhou (CN)

( * ) Notice: Subject to any disclaimer, the term of this patent is extended or adjusted under 35 U.S.C. 154(b) by 442 days.

(21) Appl. No.: 17/758,421

(22) PCT Filed: Dec. 11, 2019

(86) PCT No.: PCT/CN2019/124698
§ 371 (c)(1),
(2) Date: Jul. 6, 2022

(87) PCT Pub. No.: WO2021/088201
PCT Pub. Date: May 14, 2021

(65) Prior Publication Data
US 2023/0140184 A1    May 4, 2023

(30) Foreign Application Priority Data
Nov. 4, 2019    (CN) .......................... 201911064847.5

(51) Int. Cl.
*H04L 25/49* (2006.01)
*H04B 1/69* (2011.01)

(52) U.S. Cl.
CPC .............. *H04L 25/49* (2013.01); *H04B 1/69* (2013.01)

(58) Field of Classification Search
CPC .................................. H04L 25/49; H04B 1/69
See application file for complete search history.

(56) References Cited

U.S. PATENT DOCUMENTS

| 2002/0021764 A1* | 2/2002 | Posti | ..................... H03F 1/3282 |
| | | | 375/296 |
| 2002/0048326 A1* | 4/2002 | Sahlman | ............... H03F 1/3229 |
| | | | 375/297 |

(Continued)

FOREIGN PATENT DOCUMENTS

| CN | 1141104 A | 1/1997 |
| CN | 104040883 A | 9/2014 |

(Continued)

OTHER PUBLICATIONS

First Office Action for Chinese Application No. 201911064847.5 mailed Mar. 28, 2024.

(Continued)

*Primary Examiner* — Junpeng Chen
(74) *Attorney, Agent, or Firm* — Dorsey & Whitney LLP (57) ABSTRACT

An analog pre-distortion processing circuit and a signal processing device, the analog pre-distortion processing circuit comprises a narrowband spread spectrum module, an analog pre-distortion module and a filtering module. The narrowband spread spectrum module is used for spreading an input narrowband radio frequency signal into a broadband radio frequency signal. The bandwidth of the broadband radio frequency signal is a preset bandwidth. The analog pre-distortion module is used for carrying out analog pre-distortion linearization processing on the broadband radio frequency signal to obtain a linearized broadband radio frequency signal; the preset bandwidth is located in the optimal cancellation bandwidth of the analog pre-distortion module. The filtering module is used for carrying out signal (Continued)

filtering on the linearized broadband radio frequency signal to obtain a linearized narrowband radio frequency signal.

19 Claims, 6 Drawing Sheets

(56) References Cited

U.S. PATENT DOCUMENTS

| | | | |
|---|---|---|---|
| 2004/0032912 A1* | 2/2004 | Ocenasek | H04L 27/368 375/297 |
| 2013/0064325 A1 | 3/2013 | Kilambi et al. | |
| 2013/0099862 A1* | 4/2013 | Yu | H03F 3/45376 330/149 |
| 2013/0162348 A1* | 6/2013 | Bai | H03F 1/3247 330/149 |
| 2014/0294119 A1* | 10/2014 | Sochacki | H04B 1/0475 375/296 |
| 2017/0353199 A1 | 12/2017 | Kim et al. | |

FOREIGN PATENT DOCUMENTS

| | | |
|---|---|---|
| CN | 108494373 A | 9/2018 |
| CN | 208572040 U | 3/2019 |
| KR | 20010052106 A | 6/2001 |

OTHER PUBLICATIONS

Zhang, "Application of Spread Spectrum Technology in TD-LTE System", Telecommunications Network Technology, Mar. 5, 2017, pp. 57-61.

International Search Report and Written Opinion from International Application No. PCT/CN2019/124698 mailed Aug. 4, 2020.

Xu, "Design and Implementation of the Control System for the Adaptive Feedforward Amplifier", A Master Dissertation Submitted to University of Electronic Science and Technology of China, Mar. 15, 2016, 63 pages.

Zavosh, "Digital predistortion techniques for RF power amplifiers with CDMA applications", Technical Feature, Oct. 31, 1999, 9 pages.

\* cited by examiner

ANALOG PRE-DISTORTION PROCESSING CIRCUIT AND SIGNAL PROCESSING DEVICE

TECHNICAL FIELD

The present disclosure relates to the field of communication technologies, and in particular, to an analog pre-distortion processing circuit and a signal processing device.

BACKGROUND

With the rapid development of mobile communication technologies, 4G and 5G communication systems gradually predominate, which also causes wireless communication frequency bands to be increasingly crowded and a signal peak-to-average ratio (PAR) to be increasingly high. In order to accommodate more communication channels in a limited spectrum range, transmission technologies with high spectrum efficiency are required. Nonlinearity of a power amplifier may interfere with other communication channels in the communication frequency bands and affect the spectrum efficiency. Therefore, in order to solve the problems of the spectrum efficiency and the nonlinearity of the power amplifier, a CFR peak clipping technology and a power amplifier linearization technology are commonly used in the industry.

An analog pre-distortion technology in the power amplifier linearization technology has an important application status and plays a key role in modern wireless communication. However, during implementation of the present disclosure, the inventors find that a conventional analog pre-distortion system has poor cancellation capability for narrowband radio frequency signals.

SUMMARY

Based on the above, there is a need to provide an analog pre-distortion processing circuit and a signal processing device for addressing the above problems existing in the conventional analog pre-distortion system.

In order to achieve the above objective, the following technical solutions are adopted in embodiments of the present disclosure.

In one aspect, according to an embodiment of the present disclosure, an analog pre-distortion processing circuit is provided, including:
a narrowband spread spectrum module configured to spread an input narrowband radio frequency signal into a broadband radio frequency signal, a bandwidth of the broadband radio frequency signal being a preset bandwidth;
an analog pre-distortion module configured to perform analog pre-distortion linearization processing on the broadband radio frequency signal to obtain a linearized broadband radio frequency signal, the preset bandwidth being located in an optimal cancellation bandwidth of the analog pre-distortion module; and
a filtering module configured to perform signal filtering on the linearized broadband radio frequency signal to obtain a linearized narrowband radio frequency signal.

In another aspect, a signal processing device is further provided, including the analog pre-distortion processing circuit described above.

One of the above technical solutions has the following technical effects.

In the analog pre-distortion processing and the signal processing device, the narrowband spread spectrum module and the filtering module are used to optimize circuit design with the analog pre-distortion module, so that, when the input radio frequency signal is a narrowband radio frequency signal, the narrowband radio frequency signal is spread, so as to spread the narrowband radio frequency signal into a broadband radio frequency signal whose bandwidth is located in the optimal cancellation bandwidth of the analog pre-distortion module. Then, the analog pre-distortion module can normally and effectively perform analog pre-distortion linearization processing on the broadband radio frequency signal, and finally, signal filtering is performed on the broadband radio frequency signal after analog pre-distortion linearization processing to remove spread spectrum components in the broadband radio frequency signal to obtain a linearized narrowband radio frequency signal. As a result, the analog pre-distortion linearization processing of the narrowband radio frequency signal is realized, and the cancellation capability of the analog pre-distortion system for the narrowband radio frequency signal is greatly improved.

DETAILED DESCRIPTION OF THE EMBODIMENTS

A radio frequency power linearization technology is widely used in various industries such as communication, medical care and transportation, and has strict requirements on the linearity of a radio frequency power amplifier on some application occasions. In order to improve the linearity of the radio frequency power amplifier, a linearization technology may be generally adopted. The linearization technology may be realized in the following four manners:

a power back-off technology, a feedforward technology, an analog pre-distortion technology, and a digital pre-distortion technology.

Regarding the analog pre-distortion technology, analog pre-distortion (APD) is one of the most basic building blocks in current wireless communication systems, which is used for improving efficiency of the radio frequency power amplifier. The efficiency and linearity of the radio frequency power amplifier can be greatly improved by reducing distortion generated by the radio frequency power amplifier during operation in a nonlinear region. APD is pre-distortion processing on signals in an analog domain without digital processing on the signals, which has advantages of small delay and low costs compared with a digital pre-distortion system. Generally, pre-distortion is artificial addition of a system whose characteristics are exactly opposite to nonlinear distortion of the system including a power amplifier, so as to compensate for gain and phase changes in an entire power change range of an input signal, which is featured with a good linearization effect, flexible design and strong applicability. The combined use with a Doherty power amplifier maximizes efficiency of an analog pre-distortion system, so analog pre-distortion has gradually become the mainstream of the current linearization technology and plays a key role in modern wireless communication.

Figure 1:
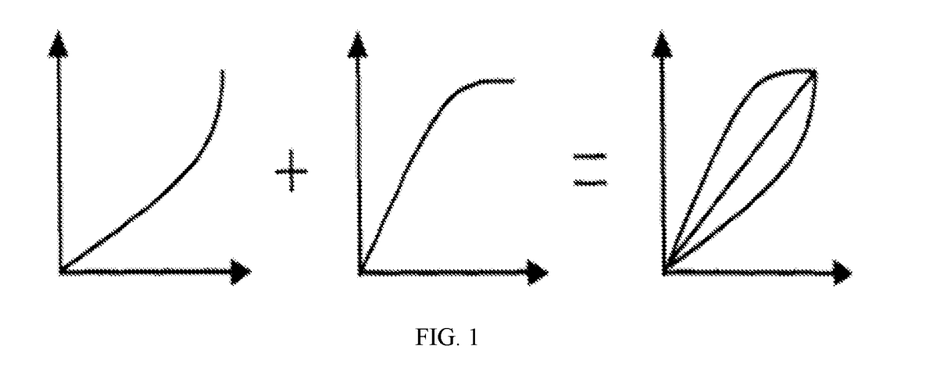
FIG. 1 is a schematic diagram of waveforms showing an operating principle of an existing analog pre-distortion processing technology.

FIG. 1 is a schematic diagram of waveforms showing an operating principle in an analog pre-distortion system. After superposition of two symmetric PA curves (also known as power amplifier curves), a height linear curve on the right side of the equal sign, that is, a linearized curve output after analog pre-distortion processing, can be obtained. When a power amplifier operates in a nonlinear region, AM-AM and AM-PM distortion curves may be present due to output compression. APD is required to output curves in directions opposite to AM-AM and AM-PM directions, so as to achieve a pre-distortion effect. According to nonlinear characteristics (amplitude and phase distortion) of the power amplifier, a signal input to the power amplifier is distorted in an opposite manner, and the combination of the two nonlinear distortion functions can achieve a highly linear and distortion-free system. Pre-distortion processing on an analog baseband is called analog pre-distortion, and pre-distortion processing on an analog circuit is called analog pre-distortion. As shown in FIG. 1, a predistorter of an analog pre-distortion system processes nonlinearity of a PA (that is, power amplifier) in an analog domain. A curve symmetric with a PA curve is generated through the predistorter (e.g., an analog pre-distortion chip hereinafter) and then superimposed on the PA curve, so that the PA curve output has better linearity, with nonlinearity canceled, as shown by the curve on the right side of the equal sign in FIG. 1.

Figure 2:
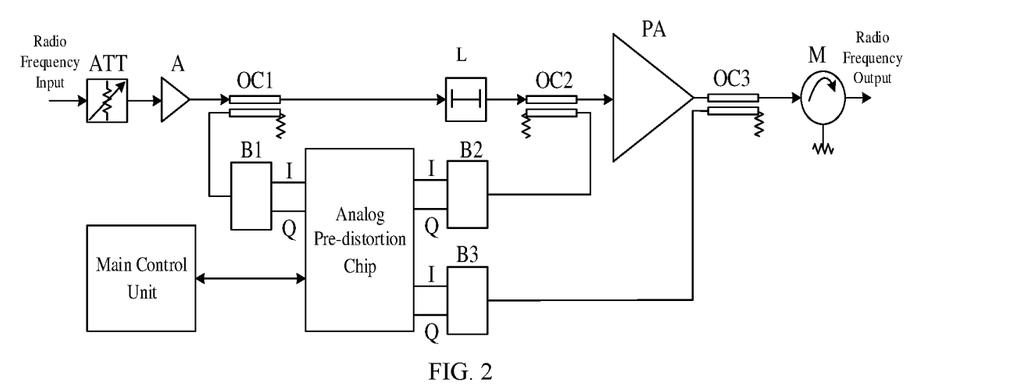
FIG. 2 is a schematic diagram showing a circuit configuration of an existing analog pre-distortion processing system.

FIG. 2 is a schematic diagram showing a circuit configuration of an analog pre-distortion linear system commonly used in a conventional analog pre-distortion linearization technology. An operating principle is as follows. After power control over an input radio frequency signal by an attenuator circuit ATT and a low-power amplifier tube A, part of the radio frequency signal is coupled through a coupler OC1 and transmitted to the analog pre-distortion chip by a balun B1. The radio frequency signal continuously transmitted forward through the coupler OC1 is delayed by a delay line L, and then is combined with an analog pre-distortion component (that is, a pre-distorted signal) output by the analog pre-distortion chip through a balun B2 in the coupler OC2. In this way, the radio frequency signal output from the coupler OC2 to the radio frequency power amplifier PA includes the input radio frequency signal and the pre-distorted signal. The radio frequency power amplifier PA amplifies the radio frequency signal output by the coupler OC2 and then outputs the radio frequency signal to a coupler OC3. The coupler OC3 couples part of the radio frequency signal as a feedback signal into the analog pre-distortion chip through a balun B3, and the radio frequency signal output by an output port of the coupler OC3 is output externally through an isolator M. The analog pre-distortion chip automatically generates a corresponding pre-distorted signal by comparing a difference between the input radio frequency signal and the feedback signal, and outputs the pre-distorted signal to the coupler OC2 through the balun B2 to be combined with the input radio frequency signal. Finally, the linearity of the radio frequency power amplifier PA can be improved by cyclic correction, so that a linearity index of the radio frequency power amplifier can be improved.

An existing analog pre-distortion system has a certain operating bandwidth (also known as cancellation bandwidth). The inventors have found in practice that the cancellation capability of the analog pre-distortion system is affected by an excessively broad or excessively narrow signal bandwidth. If a signal has an excessively narrow bandwidth, for example, a current narrowband Internet of Things (NB-IoT) signal has a bandwidth of only 180 kHz, the conventional analog pre-distortion system may have poor cancellation capability for such a narrow narrowband signal. Based on this, the present disclosure will provide the following technical solutions.

Figure 3:
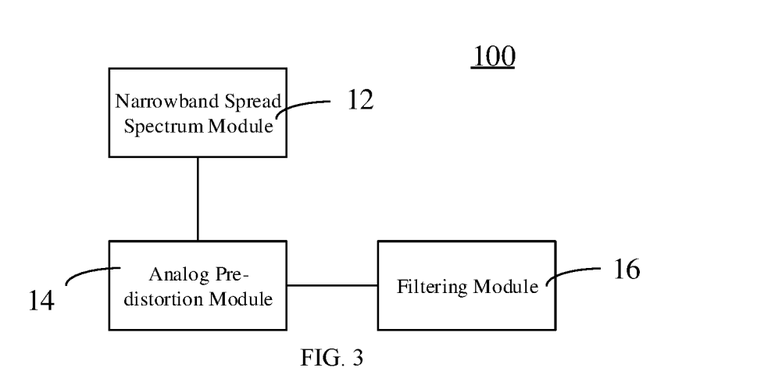
FIG. 3 is a schematic diagram illustrating a first configuration of an analog pre-distortion processing circuit according to an embodiment.

Referring to FIG. 3, in one embodiment, an analog pre-distortion processing circuit 100 is provided, including a narrowband spread spectrum module 12, an analog pre-distortion module 14 and a filtering module 16. The narrowband spread spectrum module 12 is configured to spread an input narrowband radio frequency signal into a broadband radio frequency signal. The bandwidth of the broadband radio frequency signal is a preset bandwidth. The analog pre-distortion module 14 is configured to perform analog pre-distortion linearization processing on the broadband radio frequency signal to obtain a linearized broadband radio frequency signal. The preset bandwidth is located in the optimal cancellation bandwidth of the analog pre-distortion module 14. The filtering module 16 is configured to perform signal filtering on the linearized broadband radio frequency signal to obtain a linearized narrowband radio frequency signal.

It may be understood that the narrowband spread spectrum module 12 may be a circuit module or device having a signal bandwidth extension function in the art, such as a mixer, a combiner, or a combination circuit thereof. The bandwidth of the input signal can be extended to a desired bandwidth according to a set signal bandwidth. The analog pre-distortion module 14 is a conventional analog predistorter (chip system) in the art. Analog pre-distortion module 14 of different models may have different circuit configurations, and may provide pre-distortion linearization processing functions with different performance. A specific configuration of the analog pre-distortion module 14 may be determined by a specific circuit configuration of an analog predistorter selected according to requirements of an application index in practical applications. The filtering module 16 is a filter or filtering circuit module whose filtering bandwidth corresponds to the spread spectrum bandwidth of the narrowband spread spectrum module 12, which is, for example, but not limited to one or more filters, or may be arranged as an integrated filtering circuit module with a function of amplification after filtering.

Specifically, different analog pre-distortion modules 14 have different optimal cancellation bandwidths. If a bandwidth of an input radio frequency signal is within the optimal cancellation bandwidth of the analog pre-distortion module 14, the analog pre-distortion module 14 has better cancellation performance for the radio frequency signal. In practical applications, the bandwidth of the input radio frequency signal may be ultra-narrow. Therefore, in applications where an input signal received is a narrowband radio frequency signal, spread spectrum parameters of the narrowband spread spectrum module 12 may be set in advance according to the bandwidth of the narrowband radio frequency signal, for example, a bandwidth generated autonomously in the narrowband spread spectrum module 12 or received from an external signal source and used for spectrum spread, so as to spread the input narrowband radio frequency signal into a broadband radio frequency signal with a preset bandwidth.

In practical applications, a signal bandwidth detection device may also be arranged at an input terminal of the narrowband spread spectrum module 12 to automatically detect the bandwidth of the input radio frequency signal and report the detected bandwidth to a master controller of a device to which the analog pre-distortion processing circuit 100 is applied. The master controller determines whether the current input radio frequency signal is a broadband radio frequency signal or a narrowband radio frequency signal. If the current input radio frequency signal is a broadband radio frequency signal (that is, the radio frequency signal whose signal bandwidth has been located in the optimal cancellation bandwidth of the analog pre-distortion module 14), the narrowband radio frequency signal is not controlled by the master controller, and the broadband radio frequency signal is not required to pass through the narrowband spread spectrum module 12, which directly enter the analog pre-distortion module 14 for pre-distortion processing and are output externally. The "output externally" may mean being directly output without passing through the filtering module 16 or output externally after passing through the filtering module 16. If the current input radio frequency signal is a narrowband radio frequency signal, the master controller may adjust the spread spectrum parameters of the narrowband spread spectrum module 12 according to a preset spread spectrum parameter table, so as to spread the input narrowband radio frequency signal into a broadband radio frequency signal with a preset bandwidth. Spread spectrum bandwidths required by spectrum spread of narrowband radio frequency signals with different bandwidths are pre-stored in the spread spectrum parameter table. The narrowband spread spectrum module 12, after receiving a control signal output by the master controller, may spread the narrowband radio frequency signal according to the spread spectrum bandwidth.

The broadband radio frequency signal obtained correspondingly after spectrum spread by the narrowband spread spectrum module 12 enters the analog pre-distortion module 14, and the analog pre-distortion module 14 completes analog pre-distortion linearization processing to obtain and output a linearized broadband radio frequency signal. After that, the linearized broadband radio frequency signal enters the filtering module 16 for filtering to filter out spread spectrum components in the linearized broadband radio frequency signal, that is, signal components superimposed on the narrowband radio frequency signal when the narrowband spread spectrum module 12 spreads the input narrowband radio frequency signal. After the linearized broadband radio frequency signal is filtered by the filtering module 16, a narrowband radio frequency signal after effective analog pre-distortion linearization processing is output.

The narrowband spread spectrum module 12 and the filtering module 16 are used to optimize circuit design with the analog pre-distortion module 14, so that, when the input radio frequency signal is a narrowband radio frequency signal, the narrowband radio frequency signal is spread, so as to spread the narrowband radio frequency signal into a broadband radio frequency signal whose bandwidth is located in the optimal cancellation bandwidth of the analog pre-distortion module 14. Then, the analog pre-distortion module 14 can normally and effectively perform analog pre-distortion linearization processing on the broadband radio frequency signal, and finally, signal filtering is performed on the broadband radio frequency signal after analog pre-distortion linearization processing to remove spread spectrum components in the broadband radio frequency signal to obtain a linearized narrowband radio frequency signal As a result, the analog pre-distortion linearization processing of the narrowband radio frequency signal is realized, and the cancellation capability of the analog pre-distortion system, that is, the analog pre-distortion processing circuit 100 improved based on the analog pre-distortion module 14, for the narrowband radio frequency signal is greatly improved.

Figure 4:
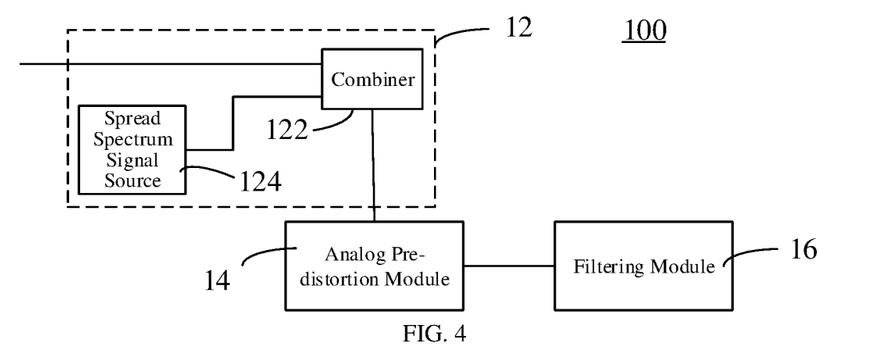
FIG. 4 is a schematic diagram illustrating a second configuration of analog pre-distortion processing circuit according to an embodiment.

Referring to FIG. 4, in one embodiment, the narrowband spread spectrum module 12 includes a combiner 122 and a spread spectrum signal source 124. A first input port of the combiner 122 is configured to receive the narrowband radio frequency signal. A second input port of the combiner 122 is connected to an output terminal of the spread spectrum signal source 124. The spread spectrum signal source 124 is configured to output a broadband signal with a target bandwidth to the combiner 122 after receiving an indication signal output by a master controller of a pre-distortion system. The combiner 122 is configured to combine the broadband signal with the narrowband radio frequency signal and output the obtained broadband radio frequency signal to the analog pre-distortion module 14.

It may be understood that the spread spectrum signal source 124 may be a conventional signal source in the art, and may generate a signal with a corresponding bandwidth according to a preset signal bandwidth or by receiving, in real time, a signal bandwidth control signal output by the master controller. The target bandwidth refers to a signal bandwidth required to be superimposed in order to spread the bandwidth of the input narrowband radio frequency signal into the preset bandwidth. A bandwidth of a signal generated by the spread spectrum signal source 124 may be manually preset to a target bandwidth according to a bandwidth of a narrowband radio frequency signal input in an actual application scenario and spread spectrum requirements thereof, or automatically set by the master controller for the spread spectrum signal source 124 according to the preset spread spectrum parameter table, and target bandwidths of different bandwidths may be automatically changed in real time as required. The master controller of the pre-distortion system refers to a master controller providing an analog pre-distortion processing process with a control function in a device to which the analog pre-distortion processing circuit 100 is applied, and is generally a main control chip inherent to the device.

Specifically, in this embodiment, the combiner 122 and the spread spectrum signal source 124 perform spectrum spread processing on the input narrowband radio frequency signal. The input narrowband radio frequency signal enters the combiner 122 through the first input port of the combiner 122. At the same time, the spread spectrum signal source 124 generates a broadband signal with a target bandwidth and outputs the broadband signal to the combiner 122 through the second input port of the combiner 122. The combiner 122 combines the input narrowband radio frequency signal with the broadband signal with the target bandwidth, so as to spread the input narrowband radio frequency signal into a broadband radio frequency signal with a preset bandwidth. In order to understand the spectrum spread process more intuitively, taking an input narrowband radio frequency signal with a frequency of 1842.5 MHz and a bandwidth of 160 kHz and a broadband signal X1 generated by the spread spectrum signal source 124 with a bandwidth of 2 MHz and a center frequency of 1844.5 MHz as an example, the input narrowband radio frequency signal Pin is combined with the broadband signal X1 generated by the spread spectrum signal source 124 in the combiner 122 to become a broadband signal (Pin+X1) with a preset bandwidth, which is then output to the analog pre-distortion module 14 for analog pre-distortion linearization processing. Finally, the broadband signal (Pin+X1) after analog pre-distortion linearization processing is filtered by the filtering module 16 to filter out the broadband signal X1 in the signal and obtain the narrowband radio frequency signal Pin after analog pre-distortion linearization processing. In this way, the input narrowband radio frequency signal Pin can be linearized within the optimal cancellation bandwidth of the analog pre-distortion module 14. The preset bandwidth of the broadband radio frequency signal may be less than or equal to the optimal cancellation bandwidth of the analog pre-distortion module 14, and the cancellation effect can be optimal when they are equal.

The input narrowband radio frequency signal can be spread efficiently and easily through the application of the combiner 122 and the spread spectrum signal source 124. There is no need to use the relatively complex spread spectrum technology in the art to spread the input narrowband radio frequency signal, so the circuit configuration is simple and the efficiency is higher.

Figure 5:
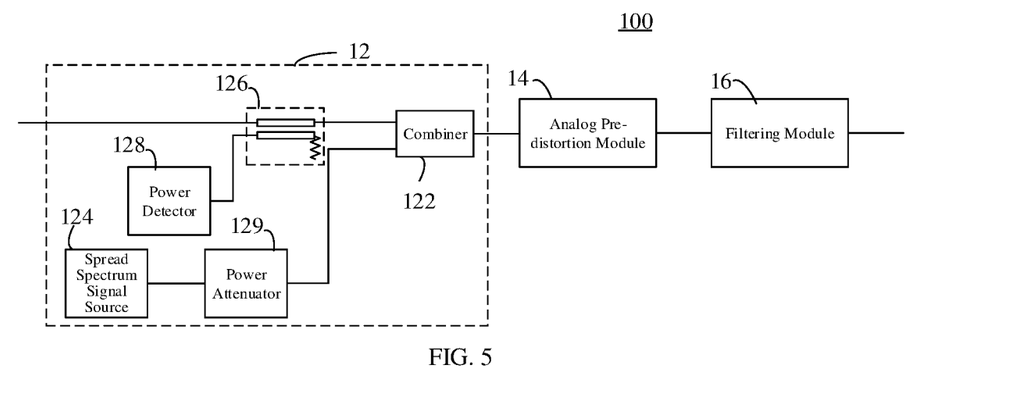
FIG. 5 is a schematic diagram illustrating a third configuration of analog pre-distortion processing circuit according to an embodiment.

Referring to FIG. 5, in one embodiment, the narrowband spread spectrum module 12 further includes a first coupler 126, a power detector 128 and a first power attenuator 129. An input port of the first coupler 126 is configured to receive the narrowband radio frequency signal. An output port of the first coupler 126 is connected to the first input port of the combiner 122. A coupling port of the first coupler 126 is connected to an input port of the power detector 128. An input terminal of the first power attenuator 129 is connected to the output terminal of the spread spectrum signal source 124. An output terminal of the first power attenuator 129 is connected to the second input port of the combiner 122. The power detector 128 is configured to detect signal power of the narrowband radio frequency signal and transmit the signal power to the master controller. The first power attenuator 129 is configured to attenuate the signal power of the passing broadband signal to less than signal power of the narrowband radio frequency signal after receiving a power adjustment signal output by the master controller.

It may be understood that the first coupler 126, the power detector 128 and the first power attenuator 129 are conventional signal processing devices in the art. The specific type and model of each device may be selected according to requirements and application costs of spread spectrum processing of the input narrowband radio frequency signal in actual application scenarios.

Specifically, the broadband signal with the target bandwidth superimposed on the input narrowband radio frequency signal is required to be filtered out after being processed and output by the analog pre-distortion module 14. If the power of the broadband signal with the target bandwidth is greater than the signal power of the input narrowband radio frequency signal, the signal power of the broadband radio frequency signal obtained may be excessively large, which increases an operating current of the analog pre-distortion module 14 and increases energy consumption accordingly. Moreover, the input narrowband radio frequency signal becomes a secondary signal relative to the broadband signal with the target bandwidth, and a processing effect of the analog pre-distortion module 14 on the narrowband radio frequency signal components may also be reduced. Therefore, there is a need to control the power of the broadband signal with the target bandwidth to be less than the signal power of the input narrowband radio frequency signal. In some practical application scenarios, the power of the broadband signal is about 3 dB less than the signal power of the narrowband radio frequency signal, which can better prevent the increase in the operating current of the analog pre-distortion module 14, and the processing effect of the analog pre-distortion module 14 on the narrowband radio frequency signal components is not affected by the magnitude of the power.

The input narrowband radio frequency signal enters the combiner 122 through the first coupler 126, and at the same time, part of the input narrowband radio frequency signal is coupled from the first coupler 126 to the power detector 128. The power detector 128 can acquire the signal power of the input narrowband radio frequency signal and transmit the signal power to the master controller, so that the master controller can control, according to the signal power of the input narrowband radio frequency signal, an amount of attenuation made by the first power attenuator 129 to the broadband signal output from the spread spectrum signal source 124, causing the signal power of the broadband signal to be less than the signal power of the input narrowband radio frequency signal. For example, if the signal power of the input narrowband radio frequency signal is 0 dB, the first power attenuator 129 attenuates the signal power of the broadband signal output by the spread spectrum signal source 124 to −3 dB. After that, the two signals are combined and output in the combiner 122. In this way, through the application of the first coupler 126, the power detector 128 and the first power attenuator 129, the signal power of the combined and output broadband radio frequency signal is moderate, which can effectively reduce the energy consumption of the analog pre-distortion module 14 and further improve the analog pre-distortion processing effect.

Figure 6:
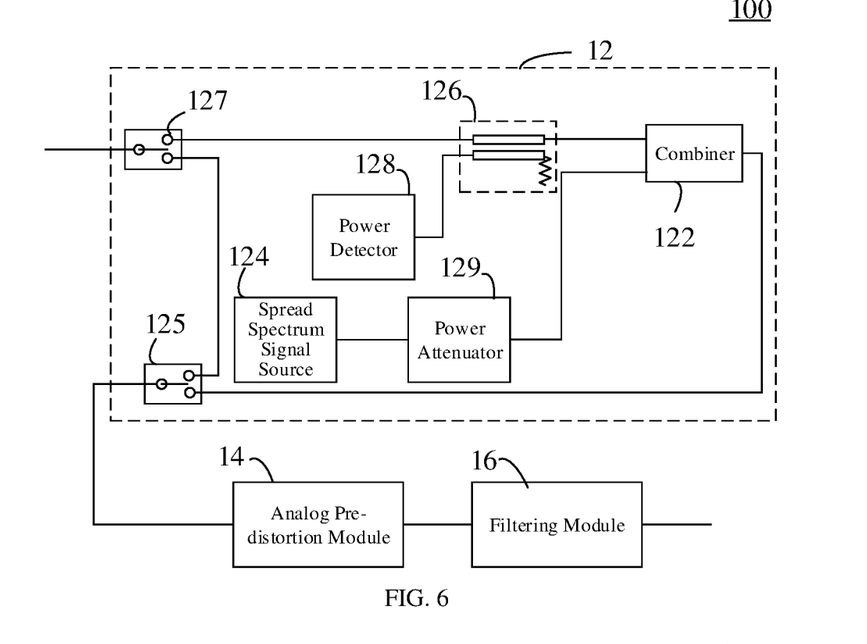
FIG. 6 is a schematic diagram illustrating a fourth configuration of analog pre-distortion processing circuit according to an embodiment.

Referring to FIG. 6, in one embodiment, the narrowband spread spectrum module 12 further includes a first radio frequency switch 127 and a second radio frequency switch 125. A movable contact of the first radio frequency switch 127 is configured to receive the narrowband radio frequency signal. A first stationary contact of the first radio frequency switch 127 is connected to the input port of the first coupler 126. A second stationary contact of the first radio frequency switch 127 is connected to a first stationary contact of the second radio frequency switch 125. A second stationary contact of the second radio frequency switch 125 is connected to a combining port of the combiner 122. A movable contact of the second radio frequency switch 125 is connected to an input port of the analog pre-distortion module 14.

It may be understood that, in this embodiment, a signal transmission path may be selected and switched by using two radio frequency switches. An input radio frequency signal enters the analog pre-distortion processing circuit 100 from the first radio frequency switch 127. If the input radio frequency signal is a broadband radio frequency signal, that is, the analog pre-distortion processing circuit 100 operates in a common analog pre-distortion processing mode, the input radio frequency signal can directly enter the analog pre-distortion module 14 for processing and output without being spread. If the input radio frequency signal is a narrowband radio frequency signal, that is, the analog pre-distortion processing circuit 100 operates in a narrowband cancellation mode, the input radio frequency signal can enter the analog pre-distortion module 14 for processing and output only after being spread.

Specifically, in the common analog pre-distortion processing mode, the movable contact and the second stationary contact of the first radio frequency switch 127 engage each other, and the movable contact and the first stationary contact of the second radio frequency switch 125 engage each other, so as to form a signal through path to bypass a path from the first coupler 126 to the combiner 122. The input radio frequency signal directly enters the analog pre-distortion module 14 through the first radio frequency switch 127 and the second radio frequency switch 125 for conventional analog pre-distortion linearization processing in the art.

For example, a circuit configuration of the analog pre-distortion module 14 is the circuit configuration of the analog pre-distortion linear system as shown in FIG. 2, the input radio frequency signal passes through the first radio frequency switch 127 and the second radio frequency switch 125, and then power control is performed through the attenuator circuit ATT and the low-power amplifier tube A to amplify the signal power to an appropriate value. Then, part of the radio frequency signal is coupled through the coupler OC1 into a balun B1. The balun B1 converts the input radio frequency signal into IQ signal components (that is, the input radio frequency signal is decomposed into two components, an I component and a Q component, with a same frequency, a same peak amplitude and a phase difference of 90). The balun B1 transmits the IQ signal components into the analog pre-distortion chip as a reference signal with an optimal linear effect.

The radio frequency signal continuously transmitted forward through the coupler OC1 is delayed by a delay line L, and then is combined with a pre-distorted signal output by the analog pre-distortion chip through a balun B2 in the coupler OC2. In this way, the radio frequency signal output from the coupler OC2 to the radio frequency power amplifier PA includes the input radio frequency signal and the pre-distorted signal. The radio frequency power amplifier PA amplifies signal power of the radio frequency signal output by the coupler OC2 to a desired power value and then outputs the radio frequency signal to a coupler OC3. The coupler OC3 couples part of the radio frequency signal as a feedback signal through a balun B3. The balun B3 converts the feedback signal from the radio frequency signal into IQ signal components and transmits the IQ signal components to the analog pre-distortion chip as a feedback reference signal. The analog pre-distortion chip compares differences between IQ signal components of the input radio frequency signal and the feedback signal and then outputs corrected IQ signal components. The corrected IQ signal components include signal differences between the input radio frequency signal and the feedback signal. The corrected IQ signal components are combined into an analog pre-distorted signal (also referred to as an analog pre-distortion correction signal) in the balun B2 and output to the coupler OC2, which is combined with the input radio frequency signal in the coupler OC2 and then transmitted to the radio frequency power amplifier PA to cancel a distortion component. The pre-distorted radio frequency signal output by the radio frequency power amplifier PA may be coupled again to part of the radio frequency signal through the coupler OC3 as a feedback signal, and transmitted to the analog pre-distortion chip through the balun B3 for further pre-distortion processing. In this way, by continuous loopback feedback, the pre-distorted signal is continually adjusted automatically, to finally achieve a state in which a difference between the feedback signal and the input radio frequency signal is minimal. Linearity of the signal output by the radio frequency power amplifier PA can be effectively improved after analog pre-distortion, so as to achieve a linearization effect. Finally, the pre-distorted radio frequency signal output forward through the coupler OC3 is output through an isolator M.

In the narrowband cancellation mode, the movable contact and the first stationary contact of the first radio frequency switch 127 engage each other, and the movable contact and the second stationary contact of the second radio frequency switch 125 engage each other, so as to form a signal spectrum spread path passing through the path from the combiner 122 to the first coupler 126. The input radio frequency signal passes through the first radio frequency switch 127 and the first coupler 126 and then enters the combiner 122, and at the same time, part of the input radio frequency signal is coupled from the first coupler 126 to the power detector 128. The power detector 128 can acquire the signal power of the input narrowband radio frequency signal and transmit the signal power to the master controller, so that the master controller can control an amount of attenuation made by the first power attenuator 129 to the broadband signal output from the spread spectrum signal source 124, causing the signal power of the broadband signal to be less than the signal power of the input narrowband radio frequency signal. After that, the input radio frequency signal and the broadband signal are combined and output in the combiner 122. The broadband radio frequency signal output enters the analog pre-distortion module 14 through the second radio frequency switch 125, so as to perform the foregoing analog pre-distortion linearization processing.

The action for engagement between the contacts of both the first radio frequency switch 127 and the second radio frequency switch 125 can be implemented by manual toggle, or automatically controlled through a preset on-off control logic by the master controller according to a preset operation mode (that is, the common analog pre-distortion processing mode or narrowband cancellation mode). Through the arrangement of the first radio frequency switch 127 and the second radio frequency switch 125, signal paths corresponding to input radio frequency signals with different bandwidths can be quickly switched, so as to realize analog pre-distortion processing on the input broadband radio frequency signal or narrowband radio frequency signal correspondingly.

In one embodiment, the filtering module 16 is a filter, an input port of the filter is connected to an output port of the analog pre-distortion module 14, and an output port of the filter is configured to output the linearized narrowband radio frequency signal externally.

It may be understood that, in this embodiment, the broadband radio frequency signal output by the analog pre-distortion module 14 can be filtered directly by using a single filter. An operating bandwidth of the filter may be determined according to a signal frequency to be filtered, that is, by the bandwidth of the broadband signal superimposed on the input narrowband radio frequency signal, so as to ensure that a narrowband radio frequency signal component in the broadband radio frequency signal output by the analog pre-distortion module 14 passes, while a broadband signal component is filtered out.

Through the application of the filter, the circuit configuration is simple and a better filtering effect can be achieved, which is beneficial to reduce manufacturing costs of the analog pre-distortion processing circuit 100.

Figure 7:
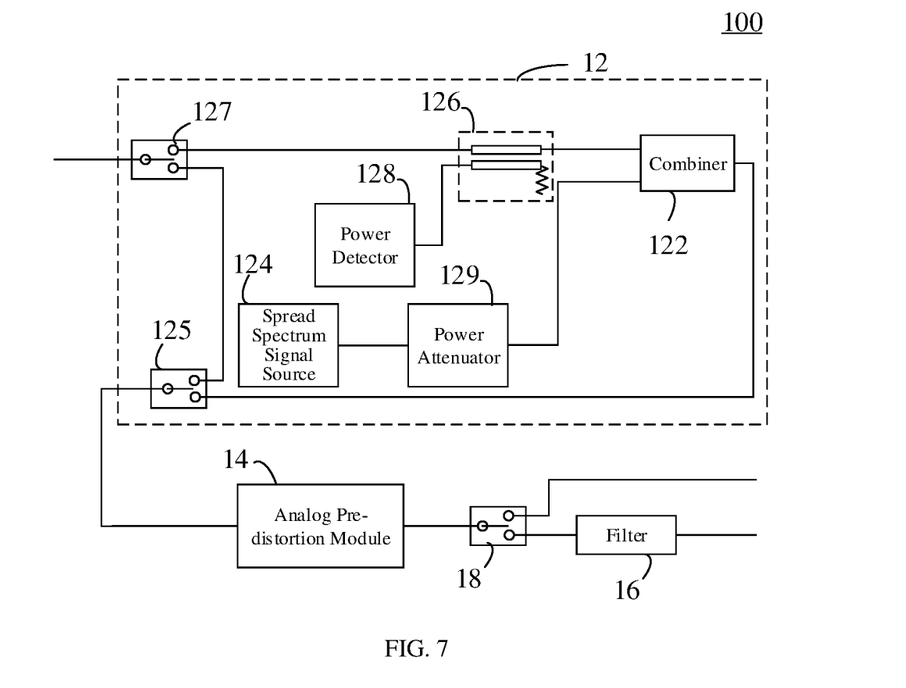
FIG. 7 is a schematic diagram illustrating a fifth configuration of analog pre-distortion processing circuit according to an embodiment.

Referring to FIG. 7, in one embodiment, the analog pre-distortion processing circuit 100 further includes a third radio frequency switch 18. A movable contact of the third radio frequency switch 18 is connected to the output port of the analog pre-distortion module 14. A first stationary contact of the third radio frequency switch 18 is connected to the input port of the filter. A second contact of the third radio frequency switch 18 is configured to output a non-spread and non-linearized broadband radio frequency signal externally.

It may be understood that a radio frequency switch may also be connected to the output port of the analog pre-distortion module 14, and linked with the first radio frequency switch 127 and the second radio frequency switch 125, so that a broadband radio frequency signal not required to go through spread spectrum processing and analog pre-distortion linearization processing to be output can be directly output externally without passing through the filter. Correspondingly, a broadband radio frequency signal going through spread spectrum processing and analog pre-distortion linearization processing to be output enters the filter for filtering through the third radio frequency switch 18 and then is output externally.

In order to understand the above solution more easily and intuitively, a detailed operation process of the analog pre-distortion processing circuit 100 in an application scenario is provided. The analog pre-distortion processing circuit 100 is powered on and initialized, and an operation mode may be manually determined and selected. If the common analog pre-distortion processing mode is selected, the movable contact and the second stationary contact of the first radio frequency switch 127 engage each other, the movable contact and the first stationary contact of the second radio frequency switch 125 engage each other, the movable contact and the second stationary contact of the third radio frequency switch 18 engage each other, and the input radio frequency signal enters the analog pre-distortion module 14 for analog pre-distortion linearization processing and is output externally directly through the second stationary contact of the third radio frequency switch 18.

If the narrowband cancellation mode is selected, the movable contact and the first stationary contact of the first radio frequency switch 127 engage each other, the movable contact and the second stationary contact of the second radio frequency switch 125 engage each other, the movable contact and the first stationary contact of the third radio frequency switch 18 engage each other, and the master controller reads the signal power detected by the power detector 128, controls the broadband signal output by the spread spectrum signal source 124, and adjusts an amount of attenuation of the first power attenuator 129 according to the signal power detected by the power detector 128 to cause the signal power of the broadband signal to be less than the signal power of the input narrowband radio frequency signal. A corresponding broadband radio frequency signal is obtained after combination and transmitted to the analog pre-distortion module 14 for analog pre-distortion linearization processing. Finally, a linearized broadband radio frequency signal enters the filter for filter through the first stationary contact of the third radio frequency switch 18 and then is output externally.

Through the application of the third radio frequency switch 18, the filtering of the radio frequency signal on the output side can be better controlled, and the signal transmission efficiency of the analog pre-distortion processing circuit 100 can be improved.

Figure 8:
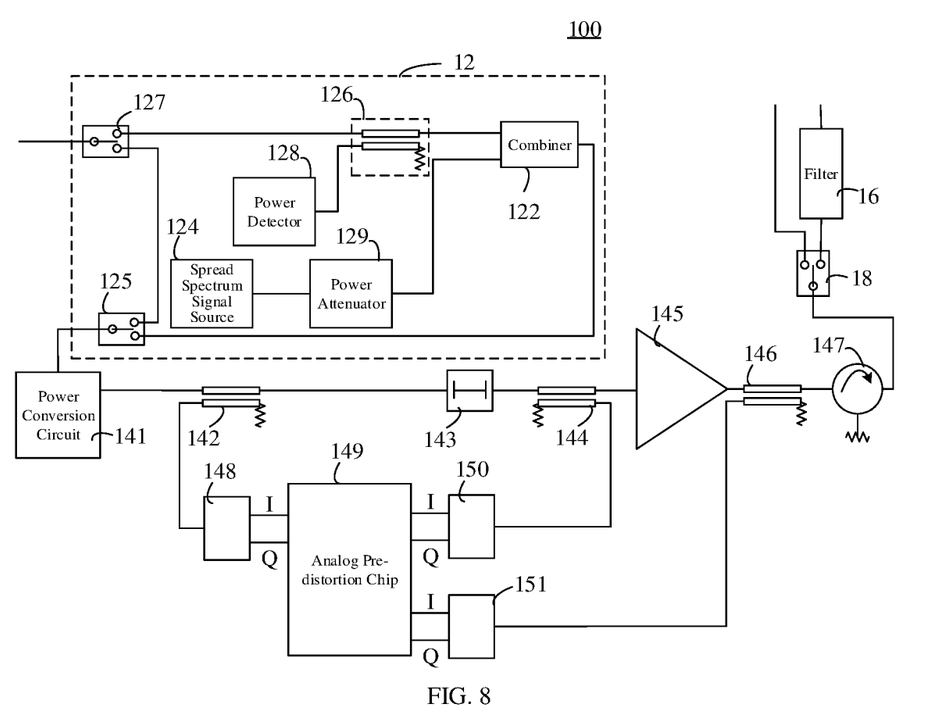
FIG. 8 is a schematic diagram illustrating a sixth configuration of analog pre-distortion processing circuit according to an embodiment.

Referring to FIG. 8, in one embodiment, the analog pre-distortion module 14 includes a power conversion circuit 141, a second coupler 142, a delay line 143, a third coupler 144, a radio frequency power amplifier 145, a fourth coupler 146, an isolator 147, a first balun 148, an analog pre-distortion chip 149, a second balun 150 and a third balun 151. The power conversion circuit 141, the second coupler 142, the delay line 143, the third coupler 144, the radio frequency power amplifier 145, the fourth coupler 146 and the isolator 147 are sequentially connected in series. An input port of the power conversion circuit 141 is connected to an output port of the narrowband spread spectrum module 12. An output port of the isolator 147 is connected to an input port of the filtering module 16. A coupling port of the second coupler 142 is connected to an input port of the analog pre-distortion chip 149 through the first balun 148. An output port of the analog pre-distortion chip 149 is connected to a coupling port of the third coupler 144 through the second balun 150. A coupling port of the fourth coupler 146 is connected to a feedback input port of the analog pre-distortion chip 149 through the third balun 151.

It may be understood that the power conversion circuit 141 may be a circuit module or integrated chip with a signal power adjustment function of an analog signal in the art, which may be specifically selected according to the magnitude of the power of the input radio frequency signal and requirements on the output power. Devices such as the second coupler 142, the delay line 143, the third coupler 144, the radio frequency power amplifier 145, the fourth coupler 146, the isolator 147, the first balun 148, the analog pre-distortion chip 149, the second balun 150 and the third balun 151 may all be conventional devices in the art, such as the corresponding devices shown in FIG. 2. Specific models may be correspondingly selected according to characteristics of transmission signals in actual application scenarios.

Specifically, the broadband radio frequency signal input to the analog pre-distortion module 14 may be a broadband radio frequency signal output correspondingly after a narrowband radio frequency signal is input and spread by the narrowband spread spectrum module 12, or a broadband radio frequency signal normally input and requiring no spread spectrum processing. The input broadband radio frequency signal first passes through the power conversion circuit 141 for signal power control to amplify the signal power to an appropriate value, and then is coupled to part of the radio frequency signal through the second coupler 142 into the first balun 148. The balun 148 converts the input broadband radio frequency signal into IQ signal components and then transmits the IQ signal components into the analog pre-distortion chip 149 as a reference signal with an optimal linear effect.

The broadband radio frequency signal continuously transmitted forward through the second coupler 142 is delayed by the delay line 143, and then is combined with a pre-distorted signal output by the analog pre-distortion chip 149 through the balun 150 in the third coupler 144. In this way, the radio frequency signal output from the third coupler 144 to the radio frequency power amplifier 145 includes the input broadband radio frequency signal and the pre-distorted signal. The radio frequency power amplifier 145 amplifies signal power of the broadband radio frequency signal output by the third coupler 144 to a desired power value and then outputs the radio frequency signal to the fourth coupler 146. The fourth coupler 146 couples part of the radio frequency signal as a feedback signal. The feedback signal is converted from the broadband radio frequency signal into corresponding IQ signal components through the third balun 151, and transmitted to the analog pre-distortion chip 149 as a feedback reference signal. The analog pre-distortion chip 149 compares differences between IQ signal components of the input broadband radio frequency signal and the feedback signal and then outputs corrected IQ signal components.

The corrected IQ signal components include signal differences between the input broadband radio frequency signal and the feedback signal. The corrected IQ signal components are combined into an analog pre-distorted signal (also referred to as an analog pre-distortion correction signal) in the second balun 150 and output to the third coupler 144, which is combined with the input broadband radio frequency signal in the coupler third 144 and then transmitted to the radio frequency power amplifier 145 to cancel a distortion component. The pre-distorted broadband radio frequency signal output by the radio frequency power amplifier 145 may be coupled again to part of the radio frequency signal through the fourth coupler 146 as a new feedback signal, and transmitted to the analog pre-distortion chip 149 through the third balun 151 for further pre-distortion processing. In this way, by continuous loopback feedback, the pre-distorted signal is continually adjusted automatically, to finally achieve a state in which a difference between the feedback signal and the input radio frequency signal is minimal. Linearity of the signal output by the radio frequency power amplifier 145 can be effectively improved after analog pre-distortion, so as to achieve a linearization effect. Finally, the pre-distorted broadband radio frequency signal output forward through the fourth coupler 146 is output through the isolator 147.

If the broadband radio frequency signal input to the analog pre-distortion module 14 is a broadband radio frequency signal output after a narrowband radio frequency signal is input and spread by the narrowband spread spectrum module 12, the broadband radio frequency signal output by the isolator 147 enters the filter for filtering through the first stationary contact of the third radio frequency switch 18, to filter out a spread spectrum signal superimposed during the spread spectrum (that is, the broadband signal with the target bandwidth). The remaining narrowband radio frequency signal is a narrowband radio frequency signal after analog pre-distortion linearization, for external output. If the input broadband radio frequency signal is a broadband radio frequency signal normally input and requiring no spread spectrum processing, the broadband radio frequency signal output by the radio frequency power amplifier 145, that is, a non-spread and non-linearized broadband radio frequency signal, may be directly output externally through the second stationary contact of the third radio frequency switch 18. Through the application of the analog pre-distortion module 14 to signal analog pre-distortion processing, application costs are not high and the applicability is high.

Figure 9:
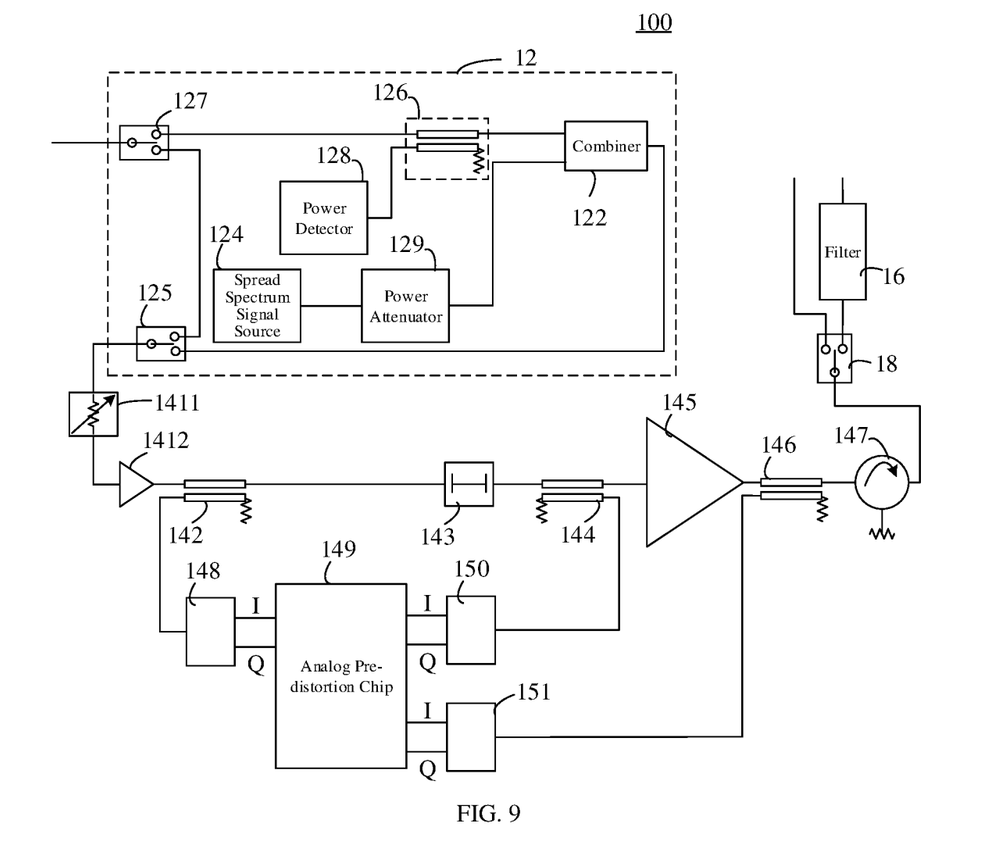
FIG. 9 is a schematic diagram illustrating a seventh configuration of analog pre-distortion processing circuit according to an embodiment.

Referring to FIG. 9, in one embodiment, the power conversion circuit 141 includes a second power attenuator 1411 and a low-power amplifier tube 1412. The second power attenuator 1411 is connected in series with the low-power amplifier tube 1412, an input port of the second power attenuator 1411 is connected to the output port of the narrowband spread spectrum module 12, and an output port of the low-power amplifier tube 1412 is connected to an input port of the second coupler 142.

It may be understood that, in this embodiment, the second power attenuator 1411 is the attenuator circuit ATT as shown in FIG. 2 or a power attenuator of a same type but of different models. Similarly, the low-power amplifier tube 1412 is the low-power amplifier tube 1412 as shown in FIG. 2 or another low-power amplifier tube 1412 of a same type but of different models. Specific models of the above devices may be selected according to processing requirements of the input radio frequency signal, provided that the power control function of the input radio frequency signal can be ensured.

Specifically, the broadband radio frequency signal output by the second radio frequency switch 125 of the narrowband spread spectrum module 12 may be a broadband radio frequency signal output after a narrowband radio frequency signal is input and spread by the narrowband spread spectrum module 12, or a broadband radio frequency signal normally input and requiring no spread spectrum processing, which is specifically determined by the input radio frequency signal and the signal transmission path selected by the first radio frequency switch 127 and the second radio frequency switch 125. The broadband radio frequency signal output by the second radio frequency switch 125 sequentially goes through the signal power control of the second power attenuator 1411 and the low-power amplifier tube 1412, and then a broadband radio frequency signal with appropriate power (which may be determined by operating parameter requirements of the analog pre-distortion module 14) is output to the second coupler 142 for subsequent processing. Through the application of the second power attenuator 1411 and the low-power amplifier tube 1412 to the signal power control over the broadband radio frequency signal, application costs of analog pre-distortion can be further reduced, and the applicability can be improved.

In one embodiment, a signal processing device is provided, including the analog pre-distortion processing circuit 100 described above.

It may be understood that the specific limitation on the analog pre-distortion processing circuit 100 in this embodiment may be obtained with reference to the limitation on the analog pre-distortion processing circuit 100 in the corresponding embodiment hereinabove, which is not described in detail herein. The signal processing device may be a variety of signal transmission and processing devices in the art using the analog pre-distortion technology and required to improve the narrowband cancellation performance of analog pre-distortion. Those skilled in the art may understand that different types of signal processing devices, in addition to including the analog pre-distortion processing circuit 100, may also include other components, such as a master control board for the device, a power supply, a cabinet, an antenna and other functional components, which may specifically be determined according to an inherent configuration of the specific signal processing device that the analog pre-distortion processing circuit 100 is applied to.

Through the application of the analog pre-distortion processing circuit 100, when the input radio frequency signal is a narrowband radio frequency signal, the narrowband radio frequency signal is spread, so as to spread the narrowband radio frequency signal into a broadband radio frequency signal whose bandwidth is located in the optimal cancellation bandwidth of the analog pre-distortion module 14. Then, the analog pre-distortion module 14 can normally and effectively perform analog pre-distortion linearization processing on the broadband radio frequency signal, and finally, signal filtering is performed on the broadband radio frequency signal after analog pre-distortion linearization processing to remove spread spectrum components in the broadband radio frequency signal to obtain a linearized narrowband radio frequency signal As a result, the analog pre-distortion linearization processing of the narrowband radio frequency signal is realized, and the cancellation capability of the analog pre-distortion system for the narrowband radio frequency signal is greatly improved.

Figure 10:
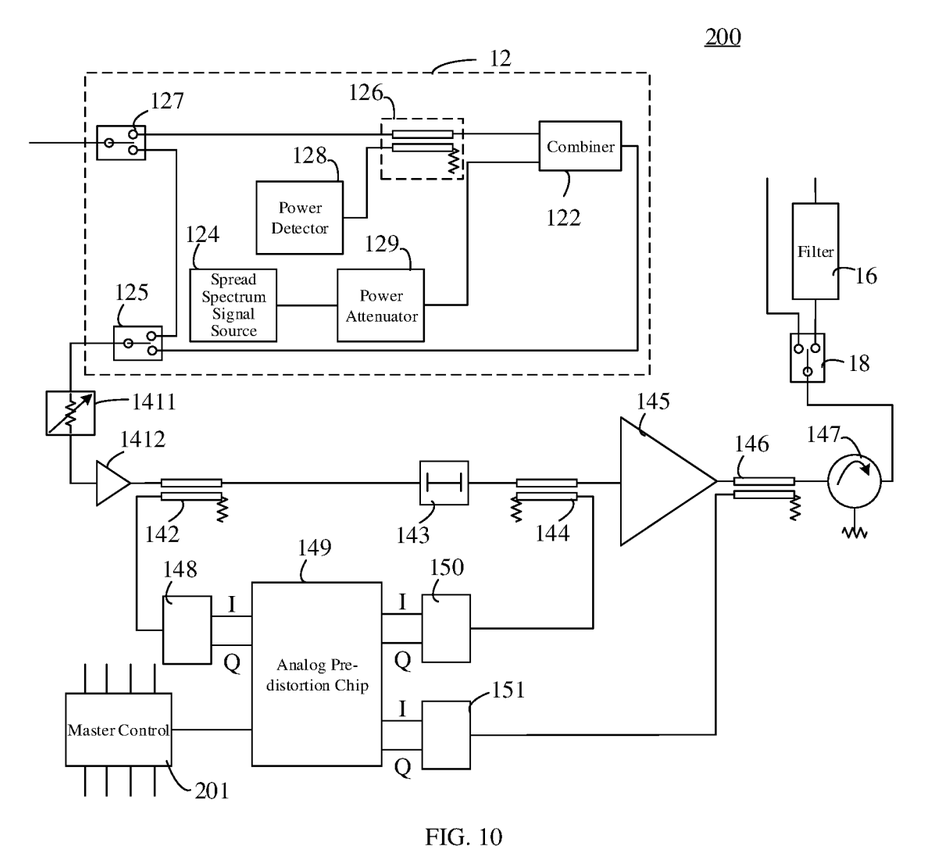
FIG. 10 is a schematic structural diagram illustrating an analog pre-distortion processing circuit of a signal processing device according to an embodiment.

Referring to FIG. 10, in one embodiment, the signal processing device further includes a master controller 201. The narrowband spread spectrum module 12 of the analog pre-distortion processing circuit 100 includes a spread spectrum signal source 124, a power detector 128 and a first power attenuator 129. The master controller 201 is configured to output an indication signal to the spread spectrum signal source 124, and configured to receive signal power transmitted by the power detector 128 and output a power adjustment signal to the first power attenuator 129.

The master controller 201 may be an existing controller on the signal processing device, may automatically control the entire analog pre-distortion processing process according to a preset analog pre-distortion processing mode, for example, selection of a mode (a non-spread mode under normal broadband radio frequency signal input, or a spread mode under narrowband radio frequency signal input), and may implement switching-on of the corresponding radio frequency switch, triggering of generation of the broadband signal from the spread spectrum signal source 124, indication of the magnitude of the attenuation power of the first power attenuator 129 and control over the pre-distortion process of the analog pre-distortion chip 149. The master controller 201 may be a MCU or a CPU, or a common programmable logic device in the art.

It may be understood that, in the above embodiment, the switching-on of the radio frequency switches, the triggering of generation of the broadband signal from the spread spectrum signal source 124, and the setting of the magnitude of the attenuation power of the first power attenuator 129 may all be set in advance manually, or automatically implemented through an external independent controller (preset to the independent controller only in the manual setting manner through a common instruction manner in the art). However, in this embodiment, control terminals of the radio frequency switches, the control terminal of the spread spectrum signal source 124, the output terminal of the power detector 128, the control terminal of the first power attenuator 129 and the control port of the analog pre-distortion chip 149 may be directly connected to the master controller 201 of the signal processing device, and the master controller 201 can automatically control the entire analog pre-distortion processing process as preset.

Through the master controller 201, the output indication of the spread spectrum signal source 124 can be realized automatically, so that, when the spread spectrum signal source 124 is required to generate the broadband signal of the target bandwidth, the broadband signal of the target bandwidth can be quickly output to the combiner 122, so as to complete the combined spread spectrum processing on the input narrowband radio frequency signal. At the same time, the master controller 201 may also automatically control the power attenuation made by the first power attenuator 129 to the broadband signal of the target bandwidth according to the signal power transmitted from the power detector 128 to ensure that the signal power of the broadband signal of the target bandwidth is less than that of the input narrowband radio frequency signal, so as to limit the signal power of the broadband radio frequency signal correspondingly output after the combined spread spectrum processing and reduce an operating current in a subsequent analog pre-distortion processing link, thereby effectively saving the energy of the whole device. In this way, through the access application of the master controller 201, the performance of the analog pre-distortion processing can be improved better.

In one embodiment, as shown in FIG. 10, the analog pre-distortion processing circuit 100 further includes a third radio frequency switch 18. The narrowband spread spectrum module 12 further includes a first radio frequency switch 127 and a second radio frequency switch 125. The master controller 201 are electrically connected to on-off control terminals of the first radio frequency switch 127 and the second radio frequency switch 125 and an on-off control terminal of the third radio frequency switch 18 respectively. The master controller 201 is further configured to output on-off control signals to the first radio frequency switch 127, the second radio frequency switch 125 and the third radio frequency switch 18 respectively.

It may be understood that explanations of the third radio frequency switch 18, the first radio frequency switch 127 and the second radio frequency switch 125 in this embodiment may be obtained with reference to the explanations of the third radio frequency switch 18, the first radio frequency switch 127 and the second radio frequency switch 125 in the corresponding embodiment of the analog pre-distortion processing circuit 100, which are not elaborated in this embodiment.

Specifically, the master controller 201 is provided with a plurality of control pins, and respective on-off control terminals of the third radio frequency switch 18, the first radio frequency switch 127 and the second radio frequency switch 125 may all be directly or indirectly electrically connected to the corresponding control pins on the master controller 201, so as to receive on-off control signals output by the master controller 201 respectively. After receiving the on-off control signals, the third radio frequency switch 18, the first radio frequency switch 127 and the second radio frequency switch 125 switch engagement states between respective movable contacts and stationary contacts, so as to form corresponding signal paths. The control over the gate switching of the radio frequency switches can be automatically completed through circuit connections between the radio frequency switches and the master controller 201, so as to effectively improve the switching efficiency of the analog pre-distortion processing mode of input signals with different bandwidths in the signal processing device.

In one embodiment, the signal processing device is any one of a base station amplifier device, a repeater device, a radio remote device, a track power amplifier device, an integrated power amplifier and a receiver.

It may be understood that the signal processing device using the analog pre-distortion processing circuit 100 may be any one of a base station amplifier device (that is, a power amplifier device in a base station in a communication system, a repeater device, a radio remote device, a track power amplifier device, an integrated power amplifier (that is, an integrated power amplifier formed by a radio frequency amplifier device and other power amplifier-related elements integrated in a same structural base) and a receiver, so as to improve the analog pre-distortion narrowband cancellation performance of the device. Those skilled in the art may understand that only several signal processing devices are listed above, and the analog pre-distortion processing circuit 100 may also be applied to other devices required to improve the narrowband cancellation performance of analog pre-distortion.

What is claimed is:

1. An analog pre-distortion processing circuit, comprising:
   a narrowband spread spectrum module configured to spread an input narrowband radio frequency signal into a broadband radio frequency signal, a bandwidth of the broadband radio frequency signal being a preset bandwidth;
   an analog pre-distortion module configured to perform analog pre-distortion linearization processing on the broadband radio frequency signal to obtain a linearized broadband radio frequency signal, the preset bandwidth being located in an optimal cancellation bandwidth of the analog pre-distortion module; and
   a filtering module configured to perform signal filtering on the linearized broadband radio frequency signal to obtain a linearized narrowband radio frequency signal;
   wherein the filtering module is a filter, an input port of the filter is connected to an output port of the analog pre-distortion module, and an output port of the filter is configured to output the linearized narrowband radio frequency signal externally.

2. The analog pre-distortion processing circuit according to claim 1, wherein the narrowband spread spectrum module includes a combiner and a spread spectrum signal source, a first input port of the combiner is configured to receive the narrowband radio frequency signal, and a second input port of the combiner is connected to an output terminal of the spread spectrum signal source; and
   wherein the spread spectrum signal source is configured to output a broadband signal with a target bandwidth to the combiner after receiving an indication signal output by a master controller of a pre-distortion system, and the combiner is configured to combine the broadband signal with the narrowband radio frequency signal and output the obtained broadband radio frequency signal to the analog pre-distortion module.

3. The analog pre-distortion processing circuit according to claim 2, wherein the narrowband spread spectrum module further includes a first coupler, a power detector and a first power attenuator;
   wherein an input port of the first coupler is configured to receive the narrowband radio frequency signal, an output port of the first coupler is connected to the first input port of the combiner, a coupling port of the first coupler is connected to an input port of the power detector, an input terminal of the first power attenuator is connected to the output terminal of the spread spectrum signal source, and an output terminal of the first power attenuator is connected to the second input port of the combiner; and
   wherein the power detector is configured to detect signal power of the narrowband radio frequency signal and transmit the signal power to the master controller, and the first power attenuator is configured to attenuate the signal power of the passing broadband signal to less than signal power of the narrowband radio frequency signal after receiving a power adjustment signal output by the master controller.

4. The analog pre-distortion processing circuit according to claim 3, wherein the narrowband spread spectrum module further includes a first radio frequency switch and a second radio frequency switch;
   wherein a movable contact of the first radio frequency switch is configured to receive the narrowband radio frequency signal, a first stationary contact of the first radio frequency switch is connected to the input port of the first coupler, and a second stationary contact of the first radio frequency switch is connected to a first stationary contact of the second radio frequency switch; and
   wherein a second stationary contact of the second radio frequency switch is connected to a combining port of the combiner, and a movable contact of the second radio frequency switch is connected to an input port of the analog pre-distortion module.

5. The analog pre-distortion processing circuit according to claim 1, further comprising a third radio frequency switch, a movable contact of the third radio frequency switch being connected to the output port of the analog pre-distortion module, a first stationary contact of the third radio frequency switch being connected to the input port of the filter, and a second contact of the third radio frequency switch being configured to output a non-spread, linearized broadband radio frequency signal externally.

6. The analog pre-distortion processing circuit according to claim 1, wherein the analog pre-distortion module includes a power conversion circuit, a second coupler, a delay line, a third coupler, a radio frequency power amplifier, a fourth coupler, an isolator, a first balun, an analog pre-distortion chip, a second balun and a third balun;
   wherein the power conversion circuit, the second coupler, the delay line, the third coupler, the radio frequency power amplifier, the fourth coupler and the isolator are sequentially connected in series, an input port of the power conversion circuit is connected to an output port of the narrowband spread spectrum module, and an output port of the isolator is connected to an input port of the filtering module;
   wherein a coupling port of the second coupler is connected to an input port of the analog pre-distortion chip through the first balun, and an output port of the analog pre-distortion chip is connected to a coupling port of the third coupler through the second balun; and
   a coupling port of the fourth coupler is connected to a feedback input port of the analog pre-distortion chip through the third balun.

7. The analog pre-distortion processing circuit according to claim 6, wherein the power conversion circuit includes a second power attenuator and a low-power amplifier tube; and
   the second power attenuator is connected in series with the low-power amplifier tube, an input port of the second power attenuator is connected to the output port of the narrowband spread spectrum module, and an output port of the low-power amplifier tube is connected to an input port of the second coupler.

8. A signal processing device, comprising the analog pre-distortion processing circuit according to claim 1.

9. The signal processing device according to claim 8, further comprising a master controller, wherein the narrowband spread spectrum module of the analog pre-distortion processing circuit includes a spread spectrum signal source, a power detector and a first power attenuator, and
   wherein the master controller is configured to output an indication signal to the spread spectrum signal source, and configured to receive signal power transmitted by the power detector and output a power adjustment signal to the first power attenuator.

10. The signal processing device according to claim 9, wherein the analog pre-distortion processing circuit further includes a third radio frequency switch, and the narrowband spread spectrum module further includes a first radio frequency switch and a second radio frequency switch; and wherein the master controller is electrically connected to on-off control terminals of the first radio frequency switch and the second radio frequency switch and an on-off control terminal of the third radio frequency switch respectively, and the master controller is further configured to output on-off control signals to the first radio frequency switch, the second radio frequency switch and the third radio frequency switch respectively.

11. The signal processing device according to claim 8, wherein the signal processing device is any one of a base station amplifier device, a repeater device, a radio remote device, a track power amplifier device, an integrated power amplifier and a receiver.

12. An analog pre-distortion processing circuit, comprising:

a narrowband spread spectrum module configured to spread an input narrowband radio frequency signal into a broadband radio frequency signal, a bandwidth of the broadband radio frequency signal being a preset bandwidth;

an analog pre-distortion module configured to perform analog pre-distortion linearization processing on the broadband radio frequency signal to obtain a linearized broadband radio frequency signal, the preset bandwidth being located in an optimal cancellation bandwidth of the analog pre-distortion module; and a filtering module configured to perform signal filtering on the linearized broadband radio frequency signal to obtain a linearized narrowband radio frequency signal;

wherein the narrowband spread spectrum module includes a combiner and a spread spectrum signal source, a first input port of the combiner is configured to receive the narrowband radio frequency signal, and a second input port of the combiner is connected to an output terminal of the spread spectrum signal source; and wherein the spread spectrum signal source is configured to output a broadband signal with a target bandwidth to the combiner after receiving an indication signal output by a master controller of a pre-distortion system, and the combiner is configured to combine the broadband signal with the narrowband radio frequency signal and output the obtained broadband radio frequency signal to the analog pre-distortion module.

13. The analog pre-distortion processing circuit according to claim 12, wherein the narrowband spread spectrum module further includes a first coupler, a power detector and a first power attenuator;

wherein an input port of the first coupler is configured to receive the narrowband radio frequency signal, an output port of the first coupler is connected to the first input port of the combiner, a coupling port of the first coupler is connected to an input port of the power detector, an input terminal of the first power attenuator is connected to the output terminal of the spread spectrum signal source, and an output terminal of the first power attenuator is connected to the second input port of the combiner; and wherein the power detector is configured to detect signal power of the narrowband radio frequency signal and transmit the signal power to the master controller, and the first power attenuator is configured to attenuate the signal power of the passing broadband signal to less than signal power of the narrowband radio frequency signal after receiving a power adjustment signal output by the master controller.

14. The analog pre-distortion processing circuit according to claim 12, wherein the narrowband spread spectrum module further includes a first radio frequency switch and a second radio frequency switch;

wherein a movable contact of the first radio frequency switch is configured to receive the narrowband radio frequency signal, a first stationary contact of the first radio frequency switch is connected to the input port of the first coupler, and a second stationary contact of the first radio frequency switch is connected to a first stationary contact of the second radio frequency switch; and wherein a second stationary contact of the second radio frequency switch is connected to a combining port of the combiner, and a movable contact of the second radio frequency switch is connected to an input port of the analog pre-distortion module.

15. The analog pre-distortion processing circuit according to claim 12, wherein the filtering module is a filter, an input port of the filter is connected to an output port of the analog pre-distortion module, and an output port of the filter is configured to output the linearized narrowband radio frequency signal externally.

16. The analog pre-distortion processing circuit according to claim 12, further comprising a third radio frequency switch, a movable contact of the third radio frequency switch being connected to the output port of the analog pre-distortion module, a first stationary contact of the third radio frequency switch being connected to the input port of the filter, and a second contact of the third radio frequency switch being configured to output a non-spread, linearized broadband radio frequency signal externally.

17. The analog pre-distortion processing circuit according to claim 12, wherein the analog pre-distortion module includes a power conversion circuit, a second coupler, a delay line, a third coupler, a radio frequency power amplifier, a fourth coupler, an isolator, a first balun, an analog pre-distortion chip, a second balun and a third balun;

wherein the power conversion circuit, the second coupler, the delay line, the third coupler, the radio frequency power amplifier, the fourth coupler and the isolator are sequentially connected in series, an input port of the power conversion circuit is connected to an output port of the narrowband spread spectrum module, and an output port of the isolator is connected to an input port of the filtering module;

wherein a coupling port of the second coupler is connected to an input port of the analog pre-distortion chip through the first balun, and an output port of the analog pre-distortion chip is connected to a coupling port of the third coupler through the second balun; and a coupling port of the fourth coupler is connected to a feedback input port of the analog pre-distortion chip through the third balun.

18. The analog pre-distortion processing circuit according to claim 17, wherein the power conversion circuit includes a second power attenuator and a low-power amplifier tube; and the second power attenuator is connected in series with the low-power amplifier tube, an input port of the second power attenuator is connected to the output port of the narrowband spread spectrum module, and an output port of the low-power amplifier tube is connected to an input port of the second coupler.

19. A signal processing device comprising:
a master controller; and
an analog pre-distortion processing circuit comprising:
　a narrowband spread spectrum module configured to spread an input narrowband radio frequency signal into a broadband radio frequency signal, a bandwidth of the broadband radio frequency signal being a preset bandwidth;
　an analog pre-distortion module configured to perform analog pre-distortion linearization processing on the broadband radio frequency signal to obtain a linearized broadband radio frequency signal, the preset bandwidth being located in an optimal cancellation bandwidth of the analog pre-distortion module; and
　a filtering module configured to perform signal filtering on the linearized broadband radio frequency signal to obtain a linearized narrowband radio frequency signal;
wherein the narrowband spread spectrum module of the analog pre-distortion processing circuit includes a spread spectrum signal source, a power detector and a first power attenuator, and
wherein the master controller is configured to output an indication signal to the spread spectrum signal source, and configured to receive signal power transmitted by the power detector and output a power adjustment signal to the first power attenuator.

* * * * *